Sept. 26, 1961 L. W. ERATH ET AL 3,002,157
LOW DISTORTION AMPLIFIER
Filed Sept. 9, 1957
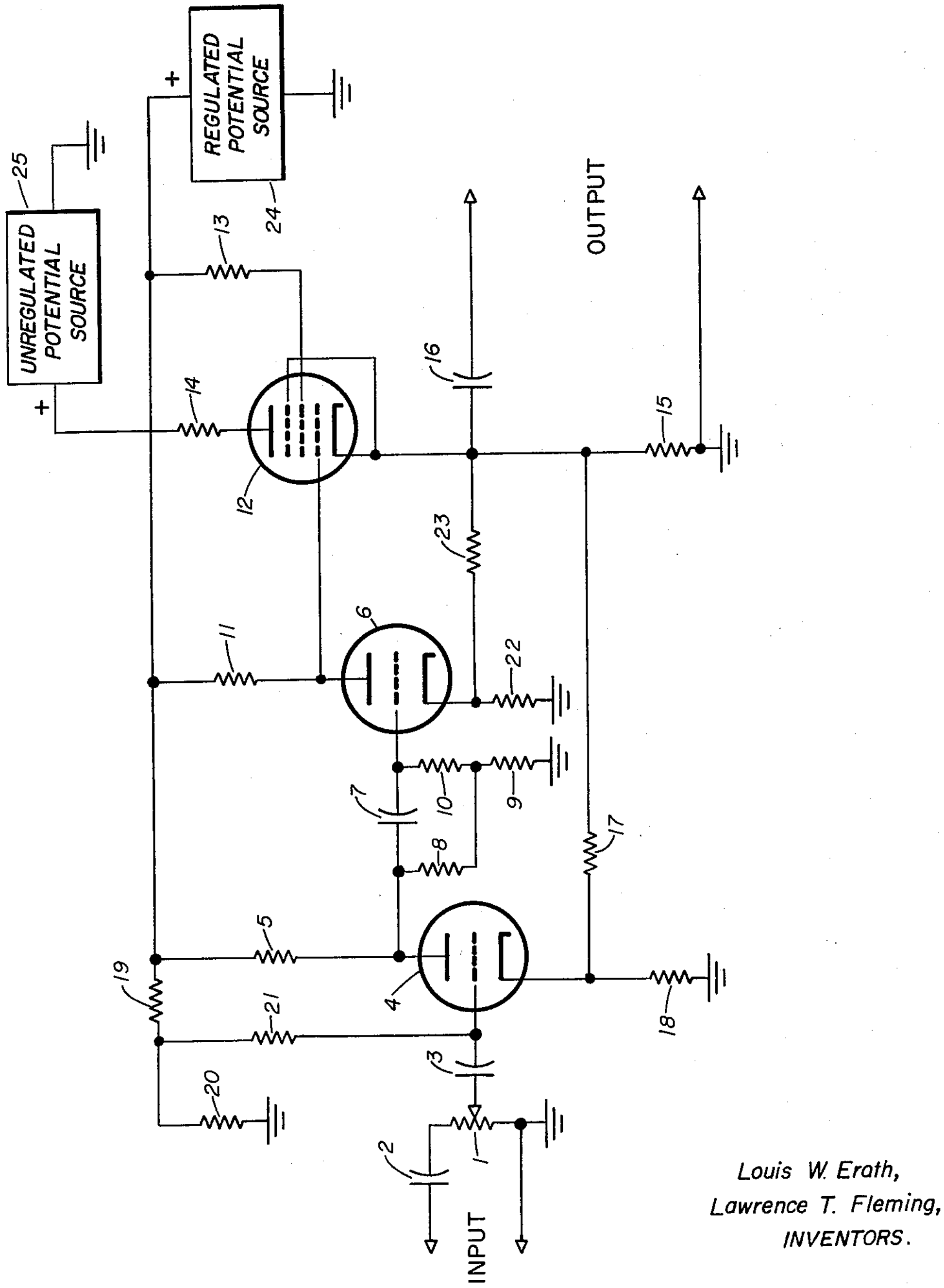
Louis W. Erath,
Lawrence T. Fleming,
INVENTORS.
BY
Burns, Doane, Benedict & Irons
ATTORNEYS

United States Patent Office 3,002,157

Patented Sept. 26, 1961

3,002,157

LOW DISTORTION AMPLIFIER

Louis W. Erath, Houston, and Lawrence T. Fleming, Bellaire, Tex., assignors, by mesne assignments, to Dresser Industries, Inc., Dallas, Tex., a corporation of Delaware Filed Sept. 9, 1957, Ser. No. 682,718

8 Claims. (Cl. 330—89)

This invention relates to amplifiers, and more particularly to A.-C. amplifiers having a very low distortion output.

The object of the present invention is a wide frequency amplifier which has low waveform distortion, which is stable at low frequencies despite the use of a large amount of negative feedback, yet which is of simple design. The preferred embodiment to be described is operable to amplify effectively an input voltage of frequency band from cycles per second to several hundred kilocycles per second.

The apparatus of the present invention represents an improvement on many different proposals of the past, including the use of degenerative feedback, quasi-direct coupling, and regenerative feedback. The apparatus is especially designed to insure that the quiescent operating potentials of the various elements of the vacuum tube amplifier be maintained stable or at constant voltages. This desirable feature is achieved by a combination of quasi-direct coupling and a particular degenerative feedback arrangement. The apparatus is also designed to effectively bypass one of the cathode resistors of the amplifier, without the provision of an actual capacitance in that circuit. It will be appreciated that bypassing very low frequencies of the order of the lower end of the range mentioned above would require a capacitor of such high capacity as to be impractical. The apparatus of the invention accomplishes the desired end result by use of a peculiar regenerative feedback loop.

The invention will now be more fully described in conjunction with a preferred embodiment thereof as shown in the accompanying drawing.

The single figure of the drawing represents a schematic diagram of a vacuum tube amplifier constructed in accordance with the invention.

Referring to the drawing, the A.-C. input voltage to the amplifier, which may vary in range between as low a frequency as one cycle per second and a high frequency of the order of 1.5 megacycles per second, is developed across a potentiometer 1 through a coupling capacitor 2. The movable tap of the potentiometer is coupled through capacitor 3 to the control grid of a triode amplifier tube 4. The plate of the amplifier is connected to a source of high potential 24, which may be regulated, through a plate resistor 5.

The amplified voltage developed across plate resistor 5 is coupled to the grid of a second triode amplifier tube 6 by capacitive coupling and direct coupling. Capacitive coupling is achieved through a capacitor 7 connected between the plate of tube 4 and the grid of tube 6, while direct coupling is obtained through the series combination of a very high resistor 8 and a relatively low resistor 9 connected between the plate of triode 4 and ground, with another high resistor 10 connected between the control grid of triode 6 and the junction between resistors 8 and 9. With this circuit, the amplified A.-C. voltage at the plate of triode 4 is coupled through capacitor 7 to the triode 6, while a small portion of the D.-C. voltage at the plate of tube 4 is coupled to the triode 6.

The plate of triode 6 is connected to the potential source 24 through a plate resistor 11, and the voltage developed across resistor 11 is directly coupled to an amplifier 12, shown as a pentode, through a direct connection between the plate of triode 6 and the control grid of the pentode. The screen of the pentode 12 is connected to the regulated potential source through a screen dropping resistor 13, while the plate is connected to an unregulated source of high potential 24, through a plate resistor 14. As is conventional, the suppressor of the pentode is connected to the cathode thereof.

Pentode 12 is operated as a cathode follower, with a resistor 15 connected between its cathode and ground, and the output voltage is available across resistor 15 through a coupling capacitor 16.

Since tube 12, especially when used as a power tube, draws a relatively high current, it is advantageous to be able to supply its plate voltage from an unregulated source in order to reduce cost. This is possible in the illustrated circuit since the output impedance of the amplifier is extremely low, with the result that variations or noise in the plate supply will be greatly attenuated between the plate of the tube and the output terminal. Since the screen current is relatively low, it is relatively inexpensive to supply the screen of tube 12 from a regulated source.

Degenerative feedback to aid in stabilization of the quiescent voltages of the amplifier tubes is obtained by connecting the cathode of pentode 12 to the cathode of triode 4 through a feedback resistor 17, and by connecting the cathode of tube 4 to ground through a cathode bias resistor 18.

With the apparatus as thus far described, if the D.-C. voltage at the plate of triode 6 should rise, the cathode of pentode 12 would correspondingly rise in voltage, and the degenerative feedback loop would cause the potential of the cathode of triode 4 to rise. The plate of triode 4 would then also rise in voltage, and the quasi-direct coupling to the grid of triode 6 would cause that grid to rise in voltage. Since the plate of triode 6 is necessarily 180° out of phase with its grid, the D.-C. voltage at the plate would tend to decrease, thereby compensating for the initial supposed increase. It can be seen, therefore, that the amplifier system so far described is inherently stable in its quiescent operating points.

In order to compensate for the D.-C. voltage developed at the cathode of triode 4 because of the cathode bias resistor thereof and the feedback loop, the grid of the triode is connected to a point of positive potential through connection thereof to a voltage divider connected between the regulated high potential and ground and including resistors 19 and 20. The grid is connected to the junction between the two resistors through resistor 21.

The quasi-direct coupling between the plate of triode 4 and the grid of triode 6 places a positive D.-C. potential on the grid of tube 6. In order to compensate for this positive potential, the triode is provided with a cathode bias resistor 22 connected directly between its cathode and ground. It will be appreciated that loss of gain would normally be caused by use of this bias resistor, which loss could be avoided by bypassing the resistor for A.-C. However, at such low frequencies as this amplifier is designed to pass, the necessary magnitude of the capacitance for bypass purposes would be impractically large. In order to achieve bypass without use of a capacitor, the cathode of triode 6 is connected to the cathode of pentode 12 through a resistor 23. This connection, together with the direct connection between the plate of triode 6 and the control grid of pentode 12, couples a voltage to the cathode of the triode which is out of phase with its normal A.-C. voltage, with the result that the cathode acts like there were no A.-C. voltage across the cathode resistor. It has been found that, for the bypassing to be effective, and for regenerative oscillations to be avoided, the product of the cathode follower gain of tube 12 and resistor 23 should be about equal to the magnitude of plate resistor 11. Practically, since the cathode follower cannot have higher than unity gain, the system will operate without regeneration such as to cause generation of oscillations if the magnitude of resistor 23 is at least as great as that of plate resistor 11.

With the amplifier as above-described and the values of the various resistors and capacitors given below, an amplifier with a gain of about 8 and feedback factor of about 30 has been obtained. It will be noted that there is only one reactive component, capacitor 7, in the feedback loop, and that the gain approaches a finite value at infinitely low frequencies, so that the whole circuit has unconditional low frequency stability even though it contains three stages and is not a direct-coupled amplifier in the ordinary sense.

It has been found beneficial to make the resistor 18 in the cathode circuit of triode 4 of deposited carbon, because of its lower voltage coefficient. This apparently reduces distortion of the circuit.

As illustrative of the possible values for the different components of the apparatus disclosed, the following list is presented. It will be understood, however, that these values are illustrative only and are not limiting of the invention.

| | | | | | |
|---|---|---|---|---|---|
| $R_1$ | | 25K | $C_{16}$ | mfd | 125 |
| $C_3$ | mfd | 1.75 | $R_{17}$ | | 10K |
| $R_5$ | | 100K | $R_{18}$ | | 1.5K |
| $C_7$ | mfd | 0.22 | $R_{19}$ | | 470K |
| $R_8$ | | 1M | $R_{20}$ | | 39K |
| $R_9$ | | 22K | $R_{21}$ | | 1M |
| $R_{10}$ | | 1M | $R_{22}$ | ohms | 820 |
| $R_{11}$ | | 47K | $R_{23}$ | | 47K |
| $R_{13}$ | ohms | 100 | $E_{24}$ | volts | 250 |
| $R_{14}$ | do | 100 | $E_{25}$ | do | 355 |
| $R_{15}$ | | 5K | | | |

It will be obvious that many minor changes could be made in the apparatus specifically described. Accordingly, the invention is not to be considered limited to the specific embodiment disclosed but rather only by the scope of the appended claims.

We claim:

1. An amplifier including a first and a second vacuum tube each having at least a cathode control grid and plate, means supplying high potential for the plates of both said tubes including a plate resistor at least for said first tube, a first cathode resistor for said first tube and a second cathode resistor for said second tube, a direct connection between the plate of the first tube and the control grid of the second tube, and a resistor having a resistance at least as great as that of said plate resistor connected between the cathodes of said tubes and operable effectively to bypass the cathode resistor of said first tube for A.-C.

2. An amplifier including first, second and third vacuum tubes each having at least a cathode, control grid and plate, an A.-C. input connection to the grid of the first tube for supplying voltage to the amplifier, means coupling the plate of the first tube to the grid of the second tube to supply the A.-C. plate voltage to the grid of the second tube and to supply a small portion of the D.-C. voltage at the plate of the first tube to the grid of the second tube, means connecting the plate of the second tube to the grid of the third tube, cathode resistors connected to the cathodes of each said tubes, a feedback resistor connected between the cathodes of the first and third tubes, and a second feedback resistor connected between the cathodes of the second and third tubes.

3. The apparatus of claim 2 in which the plate of the second tube is directly connected to the grid of the third tube.

4. The apparatus of claim 2 including a source of regulated voltage and a source of unregulated voltage, the third tube having a screen grid, the plates of the first and second tubes and the screen grid of the third tube being connected to the source of regulated voltage, and the plate of the third tube being connected to the source of unregulated voltage.

5. The apparatus of claim 2 including a bias resistor connected between the grid of the first tube and a point of relatively low positive potential.

6. A signal amplifier having a signal input circuit, first, second, and third vacuum tubes each having at least a cathode, control grid, and plate, means coupling said input circuit between the control grid of said first tube and a point of fixed low potential, a first cathode resistor connected between the cathode of said first tube and said low potential point, means supplying high potential for the plates of all three tubes including a source of constant D.-C. voltage and plate resistors connected between the plates of at least each of the first and second tubes and the positive terminal of said source, the negative terminal of the source being said point of fixed low potential, the plate of said first tube being both direct and capacity-coupled to the control grid of said second tube but the direct coupling being of only a small portion of the D.-C. potential of the plate of the first tube, a second cathode resistor connected between the cathode of said second tube and said low potential point, to compensate for the D.-C. coupled voltage on the control grid thereof, means for effectively bypassing said second cathode resistor for A.-C., the plate of said second tube being directly connected to the control grid of said third tube, a third cathode resistor connected between the cathode of said third tube and said low potential point, and a feedback resistor connected between the cathodes of said first and third tubes so as to form with the cathode resistors thereof a non-reactive degenerative feedback loop, said signal amplifier being operable to supply an amplified signal voltage across said third cathode resistor.

7. The apparatus of claim 6 in which said bypassing means is a resistor connected between the cathodes of said second and third tubes and having resistance at least equal to the resistance of the plate resistor of said second tube.

8. The apparatus of claim 6 including a high and a low resistance connected sequentially between the plate of said first tube and said low potential point, and a second high resistance connected between their junction and the control grid of the second tube.

References Cited in the file of this patent

UNITED STATES PATENTS

| | | |
|---|---|---|
| 2,368,454 | Dome | Jan. 30, 1945 |
| 2,640,962 | Gray | June 2, 1953 |
| 2,657,282 | Te Winkel | Oct. 27, 1953 |
| 2,746,016 | Schurr | May 15, 1956 |
| 2,763,732 | Rockwell | Sept. 18, 1956 |
| 2,862,046 | Relis | Nov. 25, 1958 |

OTHER REFERENCES

Electronic Engineering, February 1951, page 70 (figure) (English magazine).